Figure 1:
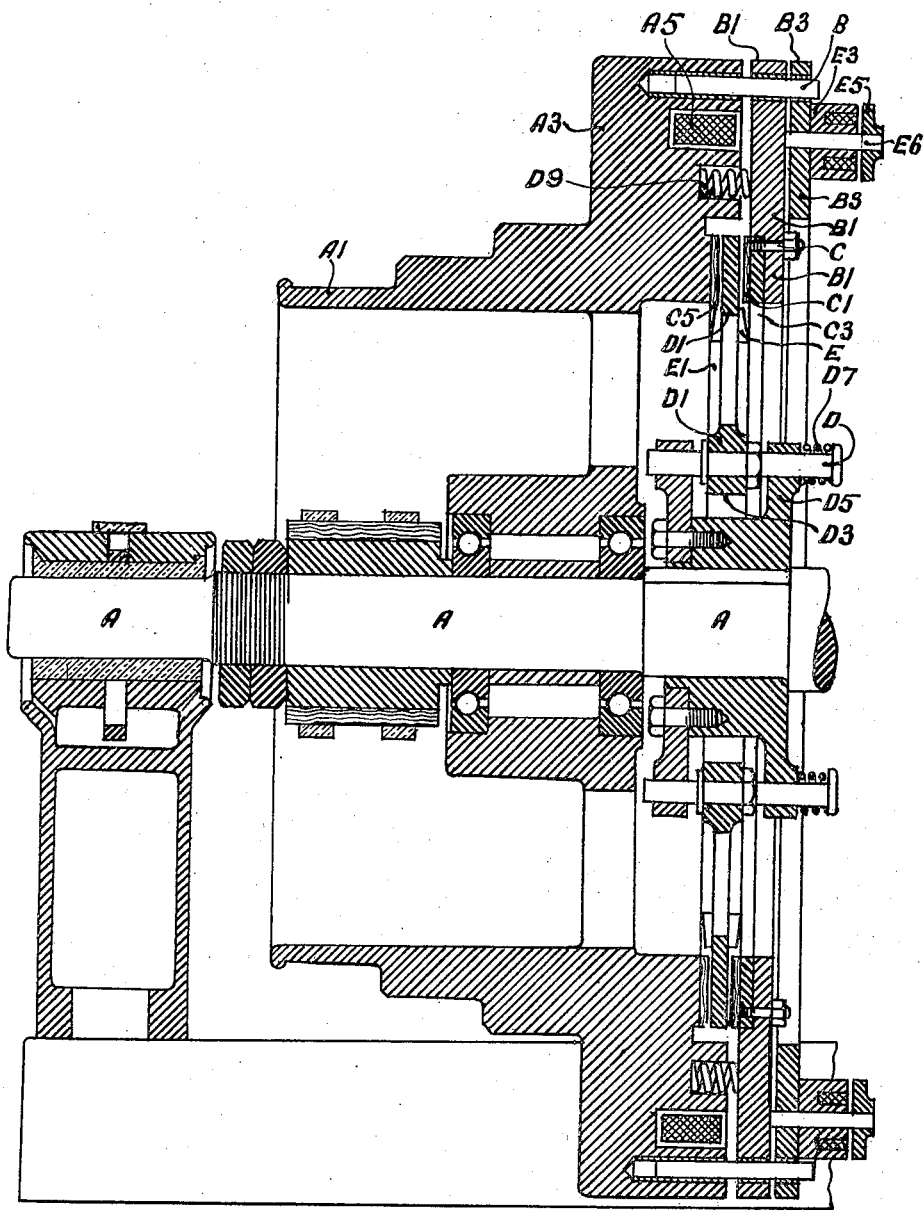

M. WALKER.
ELECTRICALLY OPERATED FRICTION CLUTCH.
APPLICATION FILED AUG. 16, 1918.

1,342,270.

Patented June 1, 1920.
3 SHEETS—SHEET 2.

INVENTOR
MALCOLM WALKER
BY *Herman and Herman*
ATTORNEYS

M. WALKER.
ELECTRICALLY OPERATED FRICTION CLUTCH.
APPLICATION FILED AUG. 16, 1918.

1,342,270.

Patented June 1, 1920.
3 SHEETS—SHEET 3.

INVENTOR
MALCOLM WALKER
BY Hinton and Hinton
ATTORNEYS

UNITED STATES PATENT OFFICE.

MALCOLM WALKER, OF GLASGOW, SCOTLAND.

ELECTRICALLY-OPERATED FRICTION-CLUTCH.

1,342,270.            Specification of Letters Patent.        Patented June 1, 1920.

Application filed August 16, 1918. Serial No. 250,262.

*To all whom it may concern:*

Be it known that I, MALCOLM WALKER, a subject of the King of Great Britain and Ireland, and a resident of Langside, Glasgow, Scotland, have invented certain new and useful Improvements in Electrically-Operated Friction-Clutches, of which the following is the specification.

This invention relates to electrically operated friction clutches of the type having an annular magnet on either the driving or driven shaft and an annular armature so supported from the magnet that while it rotates therewith it may move axially relatively thereto, the armature and magnet carrying parts of a friction clutch, the other member of which is fixed on the driven or the driving shaft.

This type of clutch is particularly applicable for planing machines and other machine tools and machines where an automatic reversal of the direction of drive is required. When used in connection with such plant, there are of course two such clutches, the two annular magnets being so driven that one rotates constantly in one direction and the other in the opposite direction, the circuits of the magnets being controlled for reversal by a switch operated in usual manner from the planer table or equivalent part, and the shaft when either clutch is energized remaining stationary.

The present invention has for its object to provide improved means for carrying both the annular armature and the second member of the friction clutch, so that on reversal of the electric circuits these parts move perfectly parallel, and instant engagement and disengagement of the parts take place, thereby obtaining instantaneous reversals of the machine platen or table, and a consequent high table time efficiency of any planer or like machine to which the clutch is applied.

The invention also provides improved means for delivering a continuous blast of air (when the clutch is in operation) over both the clutch members and the armature, and through the interpolar magnet and armature gap space, thereby keeping these various parts cool; also improved means to expedite the movement of the armature where considerable power has to be transmitted and it is consequently necessary to use a main armature of considerable size and weight.

Each clutch comprises essentially a magnetic clutch member on either the driving or driven shaft, an outer metal ring secured to the magnet at a distance from the face thereof, an armature between the magnet and the ring, endwise movable spindles carrying the armature and working in bearings in the magnet and ring, frictional surfaces on the magnet and armature situated out of the magnetic field or lines of force, a clutch member of disk form between the frictional suraces, a spider secured to either the driven or the driving shaft, and spring-controlled endwise-movable spindles securing the disk clutch member to the spider.

The disk clutch member may carry parts to act as a fan blowing air over the clutch and other surfaces and also the magnet and armature faces to keep them cool.

Further, where comparatively large and heavy armatures have to be used, on account of the power required to be transmitted, additional small magnets or solenoids are carried on the outer ring and in the electric circuit. Each of these magnets carries an armature and a non-magnetic shaft bearing on the main armature, so that when the circuit is closed the shafts act first on the main armature to expedite its closing-up on the magnet. The outer ring, being of magnetic metal such as iron or soft steel, also serves the purpose of and acts as a magnet screen in those clutches calling for heavy magnetic saturation by collecting any stray field or leakage of the main field, and so preventing such stray field from producing Foucault currents in any local iron part or portion of planing and other machines, and thus preventing waste of power or subsequent heating taking place in any local iron part or portion of said machines.

Figure 2:
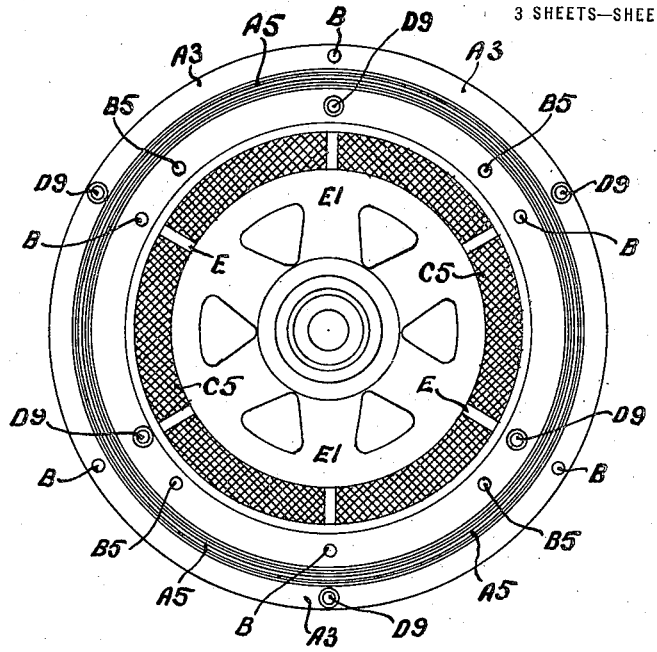
Figure 3:
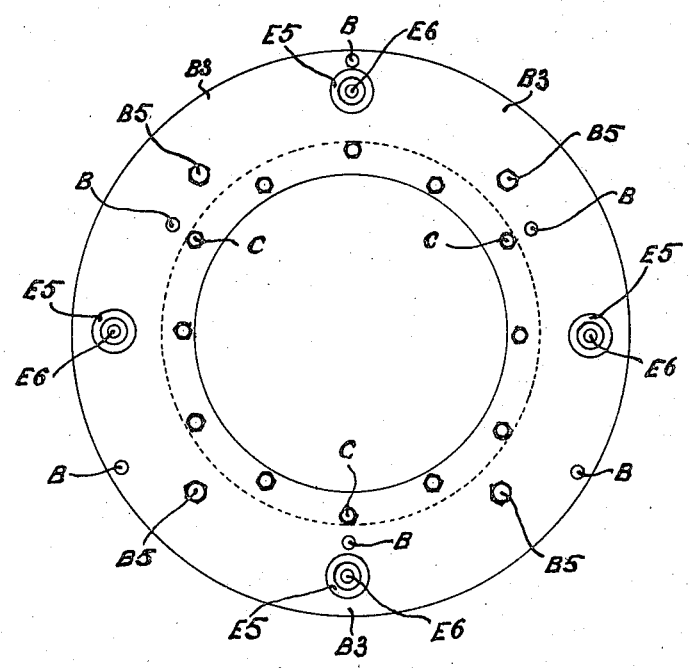
Figure 4:
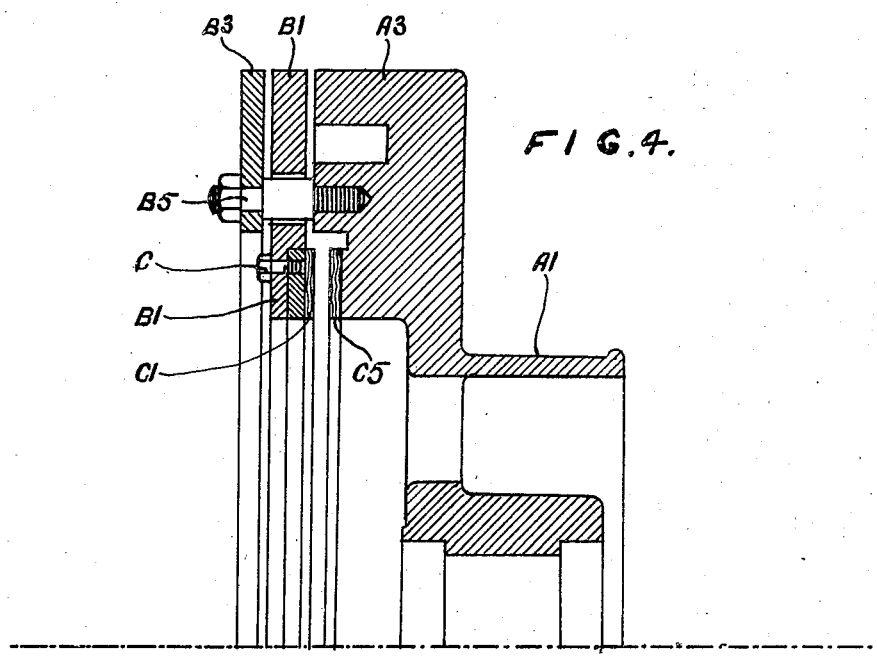
Figure 5:
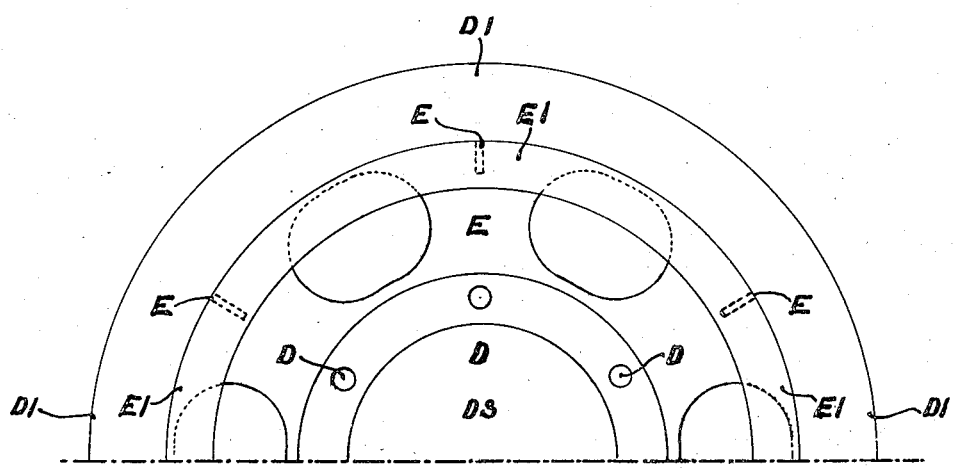

In order that the invention and the manner of performing the same may be properly understood, three sheets of explanatory drawings are hereunto appended in which Figure 1, Sheet 1, is a longitudinal sectional elevation of the improved mechanism. Fig. 2 is a face view to a smaller scale of the clutch member, Fig. 3 is a similar view to the same reduced scale of the armature, while Fig. 4 is a longitudinal section, and Fig. 5 a face view showing details hereinafter referred to.

As shown in the drawings there is provided a pulley $A^1$, free to revolve on the shaft A to be driven. Integral with the pulley $A^1$ is a magnetic clutch member $A^3$, of annular form carrying an energizing coil $A^5$. The circuit of the magnet is controlled by a switch operated in usual manner from the planer table or otherwise. In the clutch there is an annular armature $B^1$, secured to a number of spindles B. The inner ends of these spindles are carried in bearings spaced around the face of the magnetic clutch member $A^3$, and their outer ends extend through opposite bearings provided for them in an outer metal ring $B^3$. This ring is in turn carried on studs $B^5$ (Fig. 4) adjustably secured in tapped apertures spaced around the magnet face $A^3$, and passing through clearance holes in the armature $B^1$. These studs are preferably of non-magnetic material. Thus, while both the armature $B^1$ and the outer ring $B^3$ rotate with the magnet $A^3$, as both ends of the spindles B carrying the armature are supported, the armature moves perfectly parallel to and from the face of the magnet when energized and deënergized.

The armature ring $B^1$ carries on its inner face annular friction plate sectors $C^1$, secured to a ring $C^3$ carried by studs C passing through the armature ring, the studs being adjustable to compensate for wear of the friction sectors $C^1$. Similar annular friction sectors $C^5$, are secured to the opposite face of the magnet.

Between these frictional sectors there extends a light annular metal disk $D^1$, through a central aperture $D^3$ in which there passes a spider $D^5$ keyed to the driven shaft A. The disk $D^1$ is secured to its spider $D^5$ by transverse spindles D endwise movable in bearings in the spider under the influence of springs $D^7$ so that the disk is freed from engagement with the friction faces when the clutch disengages. The armature ring is also then freed from engagement with the magnet by springs $D^9$ in usual manner.

The annular disk $D^1$ carries a wheel $E^1$ comprising two annular side members and a number of transverse vanes E (Fig. 5) which act to blow air over the clutch parts and also the magnet and armature faces to cool them.

Where considerable power has to be transmitted and it is necessary to use armatures of considerably large section and consequently of considerable weight, a set of small magnets, $E^3$ preferably of the iron-clad type, each provided with an armature $E^5$ having a rod $E^6$ of non-magnetic material attached thereto, are so secured to the outer ring $B^3$, that the shafts $E^6$ pass through bearings provided in the ring. These small magnets are in electrical connection with the energizing coil $A^5$ of the clutches, and the ends of the short non-magnetic rods $E^6$ touch the ring armature $B^1$, on the outer side when the clutch is deënergized. When the clutch is energized, these small magnets being of very quick action instantly close their armatures which push inward the non-magnetic shafts $E^6$. These shafts then in turn kick the ring armature toward the magnet. The ring armature is then instantly closed up by the magnet field, and the flat annular disk clutch plate $D^1$ is thus instantly gripped between the friction faces on the armature and magnet. The extra size and weight of the armatures are thus neutralized as far as time movement is concerned.

What I claim is:—

1. In an electrically operated friction clutch, driving and driven elements, a magnetic member on one of said elements, an outer metal ring secured to said magnetic member at a distance from the face thereof, an armature between the magnet and the ring, endwise movable spindles carrying the armature and working in bearings in the magnet and ring, frictional surfaces on the magnet and armature situated out of the magnetic field, in combination with a spider secured to the other of the driving and driven elements, a clutch disk arranged between the said frictional surfaces and spring-controlled, endwise-movable spindles securing the clutch disk to the spider, substantially as described.

2. In a construction such as specified in claim 1, a plurality of small magnets spaced around the outer ring, an armature for each magnet and a non-magnetic rod associated with said armature and bearing on the main armature when the clutch is deënergized, substantially as described.

In testimony whereof I have signed my name to this specification, in the presence of two subscribing witnesses.

MALCOLM WALKER.

Witnesses:
  WILFRED HUNT,
  JAMES EAGLESOM.